United States Patent
Hewitt et al.

(10) Patent No.: US 10,019,808 B2
(45) Date of Patent: Jul. 10, 2018

(54) METHODS, COMPUTER PROGRAMS, NON-TRANSITORY COMPUTER READABLE STORAGE MEDIUMS, AND APPARATUS FOR INSPECTING OBJECTS

(71) Applicant: ROLLS-ROYCE PLC, London (GB)

(72) Inventors: Andrew Hewitt, Derby (GB); Matthew Hancock, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 15/332,349

(22) Filed: Oct. 24, 2016

(65) Prior Publication Data
US 2017/0140548 A1 May 18, 2017

(30) Foreign Application Priority Data
Nov. 13, 2015 (GB) .................... 1520042.1

(51) Int. Cl.
 G06T 7/40 (2017.01)
 G01B 11/30 (2006.01)
 G06T 7/00 (2017.01)

(52) U.S. Cl.
 CPC ............... *G06T 7/40* (2013.01); *G01B 11/30* (2013.01); *G06T 7/0004* (2013.01); *G06T 2207/10016* (2013.01); *G06T 2207/30164* (2013.01)

(58) Field of Classification Search
 CPC .......... G06T 7/40; G06T 7/0004; G01B 11/30
 See application file for complete search history.

(56) References Cited

U.S. PATENT DOCUMENTS

| 7,573,586 B1 | 8/2009 | Boyer et al. |
| 8,691,322 B2 | 4/2014 | Zierhut et al. |
| 8,759,770 B1 | 6/2014 | Woods et al. |
| 2014/0130613 A1* | 5/2014 | Adiga .................... G01N 1/06 73/863.01 |

FOREIGN PATENT DOCUMENTS

| EP | 2881731 A1 | 6/2015 |
| JP | 2013-002810 A | 1/2013 |
| WO | 2014/031634 A2 | 2/2014 |
| WO | 2014/143300 A1 | 9/2014 |

OTHER PUBLICATIONS

Apr. 22, 2016 Search Report issued in Great Britain Patent Application No. GB 1520042.1.

* cited by examiner

*Primary Examiner* — David F Dunphy
(74) *Attorney, Agent, or Firm* — Oliff PLC (57) ABSTRACT

A method of inspecting an object, the method comprising: receiving a first image of a first part of a first surface of the object from a camera arrangement; controlling relative movement between the camera arrangement and the object through a predetermined distance; receiving a second image of a second part of the first surface of the object from the camera arrangement, the second part being different to the first part; generating a third image using at least the first image and the second image; and determining a parameter associated with an abrasive surface coating on the object using the third image.

20 Claims, 7 Drawing Sheets

METHODS, COMPUTER PROGRAMS, NON-TRANSITORY COMPUTER READABLE STORAGE MEDIUMS, AND APPARATUS FOR INSPECTING OBJECTS

TECHNOLOGICAL FIELD

The present disclosure concerns methods, computer programs, non-transitory computer readable storage mediums, and apparatus for inspecting objects.

BACKGROUND

Mechanical and electro-mechanical systems (such as gas turbine engines) may comprise one or more objects (such as discs, drums, cover plates and turbine blade tips) having abrasive surface coatings for clearance control purposes. The abrasive surface coatings may be applied according to fine positional and compositional tolerances. Where an abrasive surface coating on an object is outside of those tolerances, the performance and/or efficiency of the mechanical or electro-mechanical system may be adversely affected. For example, where an abrasive surface coating on a seal fin within a gas turbine engine is outside of predetermined tolerances, the seal fin may allow gas to leak there through which may affect the performance and/or efficiency of the gas turbine engine.

BRIEF SUMMARY

According to various examples there is provided a method of inspecting an object, the method comprising: receiving a first image of a first part of a first surface of the object from a camera arrangement; controlling relative movement between the camera arrangement and the object through a predetermined distance; receiving a second image of a second part of the first surface of the object from the camera arrangement, the second part being different to the first part; generating a third image using at least the first image and the second image; and determining a parameter associated with an abrasive surface coating on the object using the third image.

The method may further comprise: receiving a fourth image of a first part of a second surface of the object from the camera arrangement, the second surface being different to the first surface, wherein the generation of the third image comprises using the fourth image.

The method may further comprise: receiving a fifth image of a second part of the second surface of the object from the camera arrangement, the second part being different to the first part, wherein the generation of the third image comprises using the fifth image.

Controlling relative movement between the camera arrangement and the object may comprise controlling a first actuator to move the object relative to the camera arrangement.

Controlling relative movement between the camera arrangement and the object may comprise controlling a second actuator to move the camera arrangement relative to the object.

The method may further comprise controlling storage of the third image in at least one memory.

The method may further comprise adjusting an abrasive coating application process using the determined parameter.

Adjusting the abrasive coating application process may include adjusting a rate of deposition of the abrasive particles on the object.

Adjusting the abrasive coating application process may include adjusting a quantity of wax to be removed from the object.

Adjusting the abrasive coating application process may include adjusting how the object is to be manipulated during application of the abrasive particles to the object.

Adjusting the abrasive coating application process may include adjusting a time period in which the object is to be plated.

The method may further comprise controlling coating of the object or one or more further objects using the adjusted abrasive coating application process.

The object may be a component of a gas turbine engine.

According to various examples there is provided a computer program that, when read by a computer, causes performance of the method as described in any of the preceding paragraphs.

According to various examples there is provided a non-transitory computer readable storage medium comprising computer readable instructions that, when read by a computer, cause performance of the method as described in any of the preceding paragraphs.

According to various examples there is provided apparatus for inspecting an object, the apparatus comprising a controller configured to: receive a first image of a first part of a first surface of the object from a camera arrangement; control relative movement between the camera arrangement and the object through a predetermined distance; receive a second image of a second part of the first surface of the object from the camera arrangement, the second part being different to the first part; generate a third image using at least the first image and the second image; and determine a parameter associated with an abrasive surface coating on the object using the third image.

The controller may be configured to: receive a fourth image of a first part of a second surface of the object from the camera arrangement, the second surface being different to the first surface. The generation of the third image may comprise using the fourth image.

The controller may be configured to: receive a fifth image of a second part of the second surface of the object from the camera arrangement, the second part being different to the first part. The generation of the third image may comprise using the fifth image.

The controller may be configured to control relative movement between the camera arrangement and the object by controlling a first actuator to move the object relative to the camera arrangement.

The controller may be configured to control relative movement between the camera arrangement and the object by controlling a second actuator to move the camera arrangement relative to the object.

The controller may be configured to control storage of the third image in at least one memory.

The controller may be configured to adjust an abrasive coating application process using the determined parameter.

The controller may be configured to adjust a rate of deposition of the abrasive particles on the object to adjust the abrasive coating application process.

The controller may be configured to adjust a quantity of wax to be removed from the object to adjust the abrasive coating application process.

The controller may be configured to adjust how the object is to be manipulated during application of the abrasive particles to the object to adjust the abrasive coating application process.

The controller may be configured to adjust a time period in which the object is to be plated to adjust the abrasive coating application process.

The controller may be configured to control coating of the object or one or more further objects using the adjusted abrasive coating application process.

The object may be a component of a gas turbine engine.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION

Embodiments will now be described by way of example only, with reference to the Figures, in which.

DETAILED DESCRIPTION

In the following description, the terms 'connected' and 'coupled' mean operationally connected and coupled. It should be appreciated that there may be any number of intervening components between the mentioned features, including no intervening components.

Figure 1:
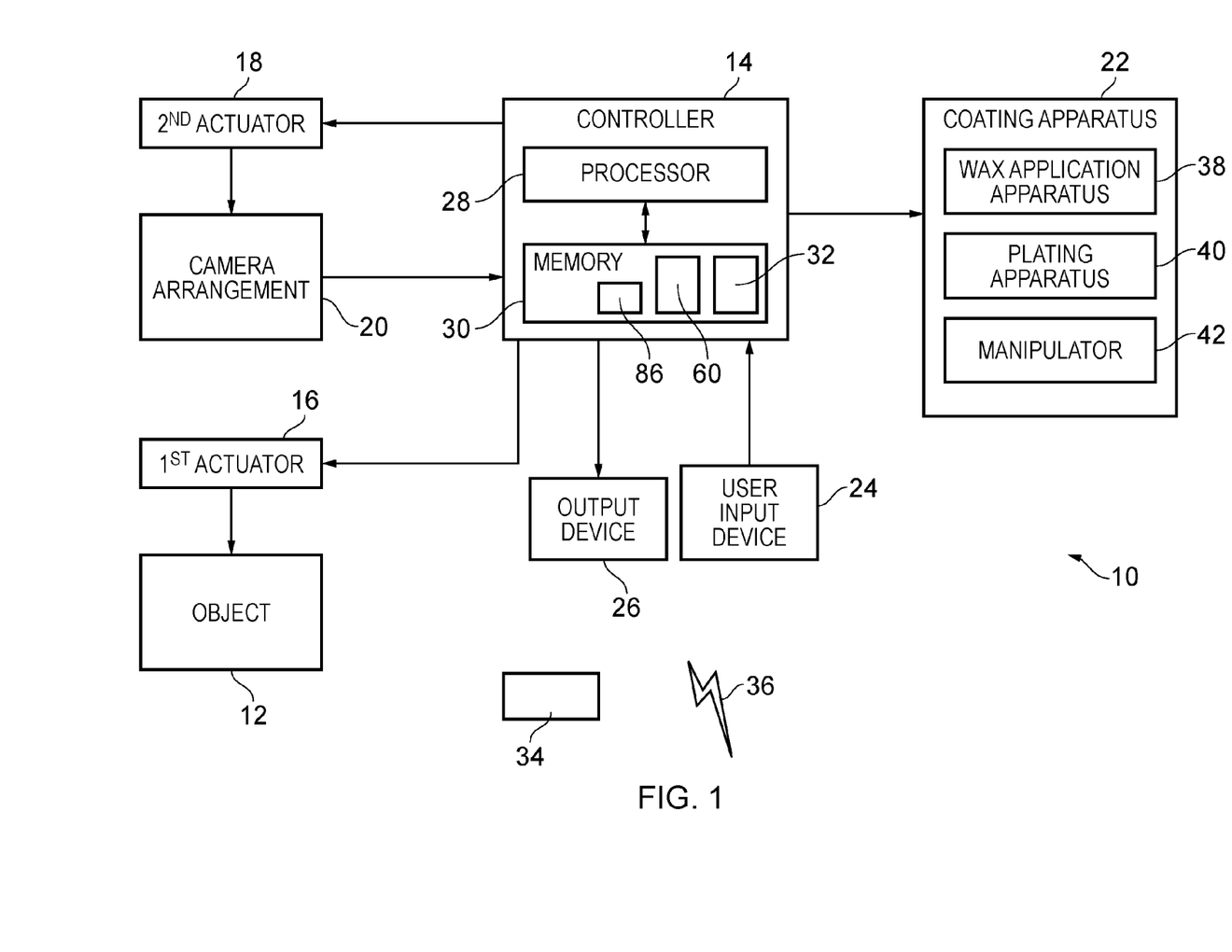
FIG. 1 illustrates a schematic diagram of an apparatus for inspecting an object according to various examples.

FIG. 1 illustrates a schematic diagram of an apparatus 10 for inspecting an object 12 according to various examples. The apparatus 10 includes a controller 14, a first actuator 16, a second actuator 18, a camera arrangement 20, coating apparatus 22, a user input device 24, and an output device 26. By way of a summary, the apparatus 10 is configured to obtain a plurality of images of different surface portions of the object 12, combine the plurality of images into a single image, and may then use the single image to adjust and perform an abrasive coating application process.

In some examples, the apparatus 10 may be a module. As used herein, the wording 'module' refers to a device or apparatus where one or more features are included at a later time, and possibly, by another manufacturer or by an end user. For example, where the apparatus 10 is a module, the apparatus 10 may only include the controller 14, and at least some of the remaining features may be added by another manufacturer, or by an end user.

The apparatus 10 may be a distributed system. For example, the first actuator 16, the object 12, the second actuator 18 and the camera arrangement 20 may be located at a first location, the coating apparatus 22 may be located at a second location, and the controller 14, the user input device 24 and the output device 26 may be located at a third location. The first location, the second location and the third location may be different parts of the same building, different buildings, different cities, different counties or states, or different countries.

The controller 14, the first actuator 16, the second actuator 18, the camera arrangement 20, the coating apparatus 22, the user input device 24, and the output device 26 may be coupled to one another via a wireless link and may consequently comprise transceiver circuitry and one or more antennas. Additionally or alternatively, controller 14, the first actuator 16, the second actuator 18, the camera arrangement 20, the coating apparatus 22, the user input device 24, and the output device 26 may be coupled to one another via a wired link and may consequently comprise interface circuitry (such as a Universal Serial Bus (USB) socket). It should be appreciated that the controller 14, the first actuator 16, the second actuator 18, the camera arrangement 20, the coating apparatus 22, the user input device 24, and the output device 26 may be coupled to one another via any combination of wired and wireless links.

The controller 14 may be unitary and located at a single location. For example, the controller 14 may consist of a single controller that is coupled to the first actuator 16, the second actuator 18, the camera arrangement 20, the coating apparatus 22, the user input device 24, and the output device 26. Alternatively, the controller 14 may be distributed across two or more locations. For example, the controller 14 may comprise a plurality of separate controllers, for example, a first controller coupled to the first actuator 16, the second actuator 18 and the camera arrangement 20, a second controller coupled to the user input device 24 and the output device 26, and a third controller coupled to the coating apparatus 22).

Figure 2:
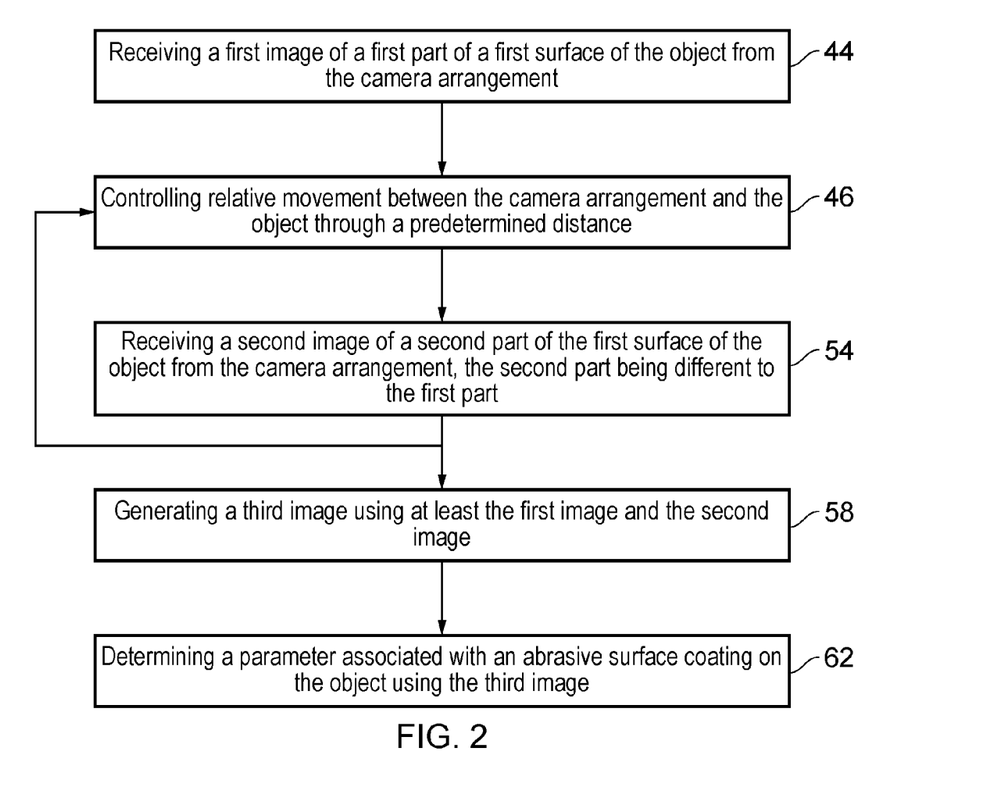
FIG. 2 illustrates a flow diagram of a method of inspecting an object according to various examples.
Figure 4:
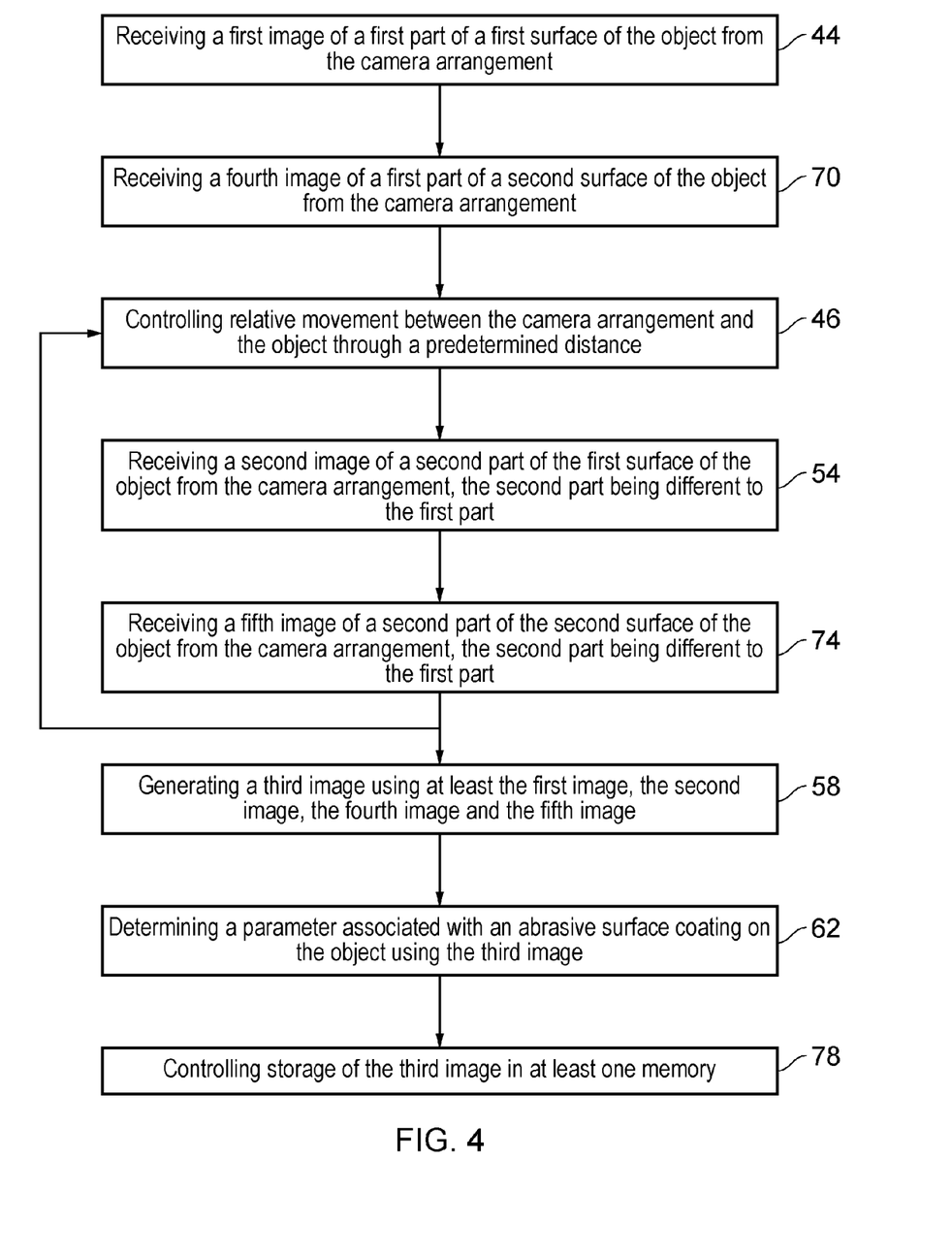
FIG. 4 illustrates a flow diagram of another method of inspecting an object according to various examples.
Figure 7:
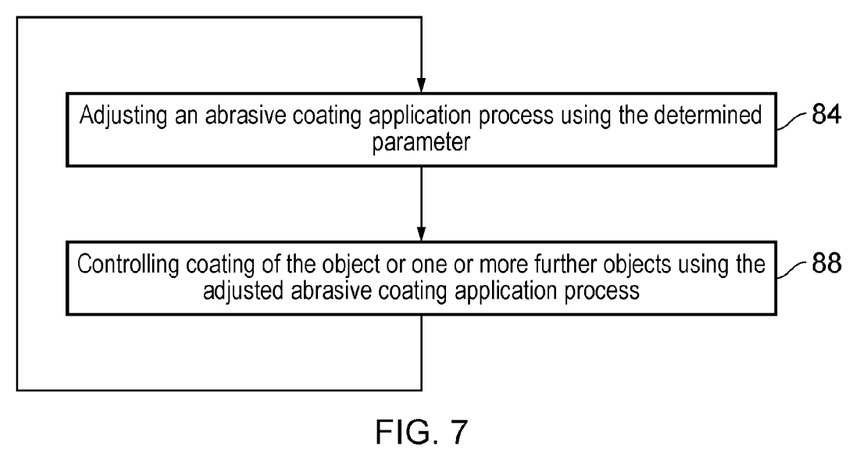
FIG. 7 illustrates a flow diagram of a method of controlling coating of an object according to various examples.

The controller 14 may comprise any suitable circuitry to cause performance of the methods described herein and as illustrated in FIGS. 2, 4, and 7. The controller 14 may comprise: at least one application specific integrated circuit (ASIC); and/or at least one field programmable gate array (FPGA); and/or single or multi-processor architectures; and/or sequential (Von Neumann)/parallel architectures; and/or at least one programmable logic controllers (PLCs); and/or at least one microprocessor; and/or at least one microcontroller; and/or a central processing unit (CPU); and/or a graphics processing unit (GPU), to perform the methods.

By way of an example, the controller 14 may comprise at least one processor 28 and at least one memory 30. The memory 30 stores a computer program 32 comprising computer readable instructions that, when read by the processor 28, causes performance of the methods described herein, and as illustrated in FIGS. 2, 4, and 7. The computer program 32 may be software or firmware, or may be a combination of software and firmware.

The processor 28 may include at least one microprocessor and may comprise a single core processor, may comprise multiple processor cores (such as a dual core processor or a quad core processor), or may comprise a plurality of processors (at least one of which may comprise multiple processor cores).

The memory 30 may be any suitable non-transitory computer readable storage medium, data storage device or devices, and may comprise a hard disk drive and/or a solid state drive. The memory may be permanent non-removable memory, or may be removable memory (such as a universal serial bus (USB) flash drive).

The computer program 32 may be stored on a non-transitory computer readable storage medium 34. The computer program 32 may be transferred from the non-transitory computer readable storage medium 34 to the memory 30.

The non-transitory computer readable storage medium 34 may be, for example, a secure digital (SD) card, or an optical disk such as a compact disk (CD), a digital versatile disk (DVD) or a Blu-ray disk. In some examples, the computer program may be transferred to the memory via a signal 36 (such as a wireless signal or a wired signal).

The first actuator 16 is configured to move the object 12 relative to the camera arrangement 20. For example, the first actuator 16 may comprise a fixture for holding the object 12 and one or more motors for moving the fixture (and thus the object 12). The controller 14 is configured to control the first actuator 16 to move the object 12 relative to the camera arrangement 20.

The second actuator 18 is configured to move the camera arrangement 20 relative to the object 12. For example, the second actuator 18 may comprise a robotic arm for holding the camera arrangement 20 and one or more motors for moving the robotic arm (and thus the camera arrangement 20) relative to the object 12.

It should be appreciated that the apparatus 10 may only comprise one of the first actuator 16 and the second actuator 18. For example, the camera arrangement 20 may be held in a static position (where the apparatus 10 does not comprise the second actuator 18) and the first actuator 16 is configured to move the object 12 relative to the static camera arrangement 20. By way of another example, the object 12 may be held in a static position (where the apparatus 10 does not comprise the first actuator 16) and the second actuator 18 is configured to move the camera arrangement 20 relative to the static object 12.

The camera arrangement 20 includes one or more cameras for obtaining images of one or more surfaces of the object 12. For example, the camera arrangement 20 may comprise a first camera for obtaining images of a first surface of the object 12, a second camera for obtaining images of a second surface of the object 12, and a third camera for obtaining images of a third surface of the object 12 and so on. By way of another example, the camera arrangement 20 may comprise one or more cameras that are moveable between different surfaces to enable images to be obtained for those surfaces. The camera arrangement 20 may comprise any suitable cameras and may comprise complementary metal-oxide-semiconductor (CMOS) cameras and/or charge coupled device (CCD) cameras. The controller 14 is configured to receive images from the camera arrangement 20.

The coating apparatus 22 is configured to provide an abrasive surface coating to at least one surface of the object 12. The coating apparatus 22 may include wax application apparatus 38, plating apparatus 40 and a manipulator 42. The wax application apparatus 38 may comprise a receptacle for coating the object 12 in wax, and a tool for removing the wax to expose one or more surfaces of the object 12. The plating apparatus 40 may comprise a first receptacle for coating the exposed surfaces of the object 12 with a matrix material (for example, a nickel matrix or a cobalt matrix) and a second receptacle for coating the exposed surfaces of the object 12 with abrasive particles (such as cubic boron nitride (cBN) particles). The manipulator 42 is configured to move and re-orient the object 12 within the second receptacle of the plating apparatus 40.

It should be appreciated that the above mentioned structure of the coating apparatus 22 is provided as an example and that the coating apparatus 22 may have a different structure in other examples.

The user input device 24 may comprise any suitable device for enabling an operator to at least partially control the apparatus 10. For example, the user input device may comprise one or more of a keyboard, a keypad, a touchpad, a touchscreen display, and a computer mouse. The controller 14 is configured to receive signals from the user input device 24.

The output device 26 may be any suitable device for conveying visual information to a user. For example, the output device 26 may be a display (such as a liquid crystal display (LCD), or a light emitting diode (LED) display, or an organic light emitted diode display (OLED), an active matrix organic light emitting diode (AMOLED) display, or a thin film transistor (TFT) display, or a cathode ray tube (CRT) display), and/or a printer (such as an inkjet printer or a laser printer). The controller 14 is arranged to provide a signal to the output device 26 to cause the output device 26 to convey information to the user.

FIG. 2 illustrates a flow diagram of a method of inspecting an object 12 according to various examples.

At block 44, the method includes receiving a first image of a first part of a first surface of the object 12 from the camera arrangement 20. For example and with reference to FIG. 3A, the object 12 has a first surface 46 comprising a first part 48 and a second part 50. The first surface 46 comprises an abrasive surface coating including a matrix material 461 and a plurality of abrasive particles 462. At block 44, the camera arrangement 20 is positioned adjacent to the first part 48 to obtain the first image 52 (illustrated in FIG. 3B) of the first part 48 of the first surface 46 of the object 12. The controller 14 is configured to receive the first image 52 from the camera arrangement 20.

At block 46, the method includes controlling relative movement between the camera arrangement 20 and the object 12 through a predetermined distance. For example, the controller 14 may control the first actuator 16 to move the object 12 through a predetermined distance and/or may control the second actuator 18 to move the camera arrangement 20 through a predetermined distance.

At block 54, the method includes receiving a second image of a second part of the first surface of the object 12 from the camera arrangement 20, the second part being different to the first part. For example and with reference to FIG. 3C, the camera arrangement 20 is positioned adjacent to the second part 50 to obtain the second image 56 (illustrated in FIG. 3D) of the second part 50 of the first surface 46 of the object 12. The controller 14 is configured to receive the second image 56 from the camera arrangement 20.

Figure 3A:
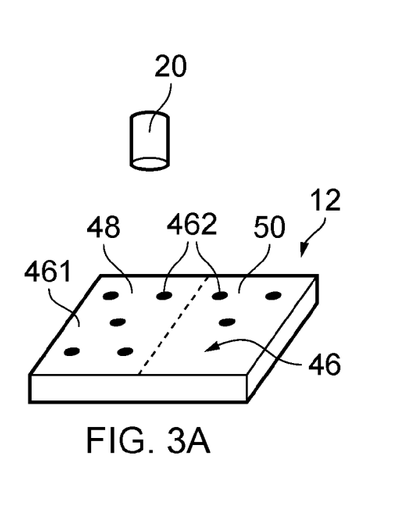
FIGS. 3A, 3B, 3C, 3D, 3E schematically illustrate a process of imaging an object according to various examples.
Figure 3B:
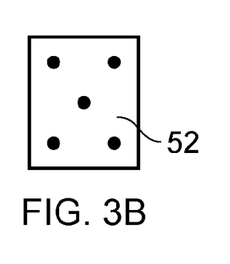
Figure 3C:
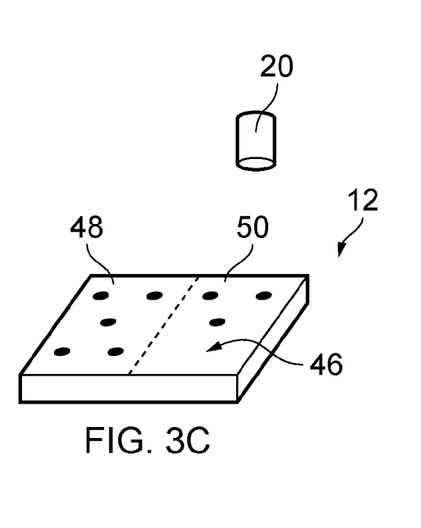
Figure 3D:
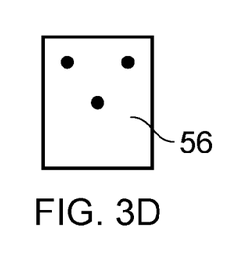

The 'predetermined distance' mentioned above is a distance whereby one or both of the object 12 and the camera arrangement 20 are moved that results in the second image 56 being at least partially different to the first image 52. In some examples, the second image 56 may be wholly different to the first image 52 (that is, the second image 56 may not overlap with the first image 52). In other examples, the second image 56 may be partially different to the first image 52 (that is, the second image 56 may overlap with the first part 48).

It should be appreciated that the object 12 and/or the camera arrangement 20 may be continuously moved and the first and second images 52, 56 may be captured while the object 12 and/or the camera arrangement 20 are moving. In other examples, the object 12 and/or the camera arrangement 20 may be moved for a period of time, and then held in a static arrangement for another period of time to enable the first and second images 52, 56 to be captured.

The method may then return to block 46 so that a further part of the first surface 46 may be imaged.

At block 58, the method includes generating a third image 60 (illustrated in FIG. 3E) using at least the first image 52 and the second image 56. For example, the controller 14 may be configured to generate the third image 60 by concatenating the first image 52 and the second image 56. In some examples, the third image 60 may be generated as a new data file. In other words, the data files for the first and second images 52, 56 are not changed during generation of the third image 60 data file. In other examples, the third image 60 may be generated by changing one of the data files for the first image 52 or the second image 56. For example, the third image 60 may be generated by adding the second image 56 to the first image 52 data file.

Figure 3E:
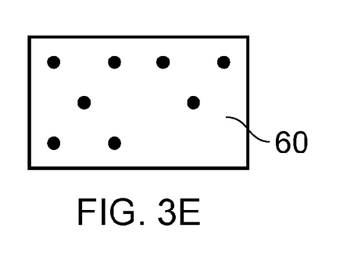

At block 62, the method includes determining a parameter associated with an abrasive surface coating on the object 12 using the third image 60. For example, the controller 14 may analyse the third image 60 to determine the number of abrasive particles 462 within the third image 60. By way of another example, the controller 14 may analyse the third image 60 to determine the average density of abrasive particles 462 within the third image 60. By way of a further example, the controller 14 may analyse the third image 60 to determine the ratio of matrix material 461 coverage to abrasive particle 462 coverage.

The controller 14 may use any suitable technique for analysing the third image 60 to determine the parameter. For example, the controller 14 may use a histogram to analyse the first surface 46 where abrasive particles 462 are differentiated from the matrix material 461 by colour (for example, cubic boron nitride abrasive particles are black, whereas a cobalt matrix is grey).

It should be appreciated that the method may include determining a plurality of parameters at block 62. For example, the controller 14 may analyse the third image 60 to determine a first parameter (for example, the number of abrasive particles 462 within the third image 60), and a second parameter (for example, the average density of abrasive particles 462 within the third image 60).

FIG. 4 illustrates a flow diagram of another method of inspecting an object 12 according to various examples. The method illustrated in FIG. 4 is similar to the method illustrated in FIG. 2 and where the blocks are similar, the same reference numerals are used.

Figure 5A:
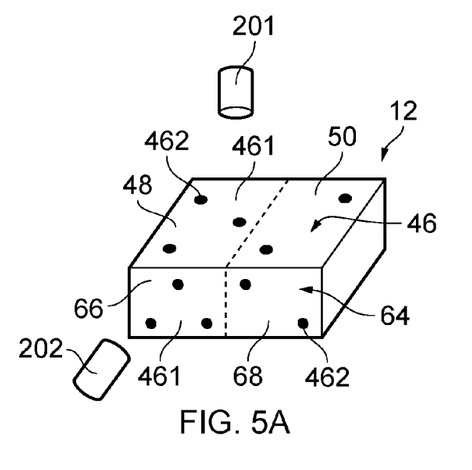
FIGS. 5A, 5B, 5C, 5D, 5E, 5F, 5G schematically illustrate another process of imaging an object according to various examples.
Figure 5B:
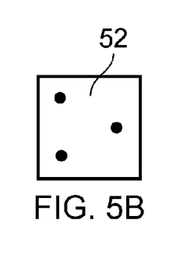

At block 44, the method includes receiving a first image of a first part of a first surface of the object 12 from the camera arrangement 20. For example and with reference to FIG. 5A, the object 12 has a first surface 46 comprising a first part 48 and a second part 50, and a second surface 64 comprising a first part 66 and a second part 68. The first and second surfaces 46, 68 comprise an abrasive surface coating including a matrix material 461 and a plurality of abrasive particles 462. The camera arrangement 20 includes a first camera 201 and a second camera 202. At block 44, the first camera 201 is positioned adjacent to the first part 48 to obtain the first image 52 (illustrated in FIG. 5B) of the first part 48 of the first surface 46 of the object 12. The controller 14 is configured to receive the first image 52 from the first camera 201.

Figure 5C:
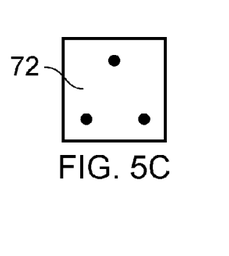
Figure 5D:
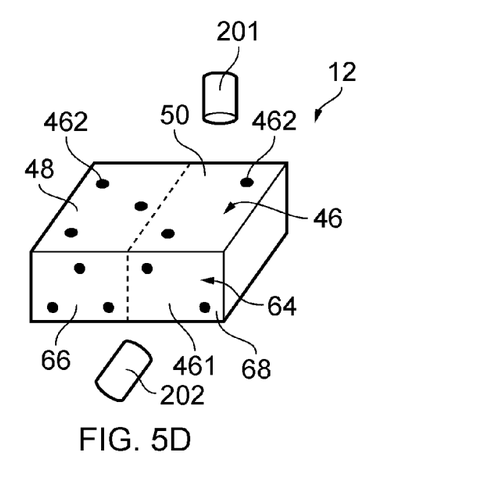

At block 70, the method includes receiving a fourth image of a first part of a second surface of the object 12 from the camera arrangement 20. The second camera 202 is positioned adjacent to the first part 66 to obtain the fourth image 72 (illustrated in FIG. 5C) of the first part 66 of the second surface 64. The controller 14 is configured to receive the fourth image 72 from the second camera 202.

At block 46, the method includes controlling relative movement between the camera arrangement 20 and the object 12 through a predetermined distance. For example, the controller 14 may control the first actuator 16 to move the object 12 relative to the camera arrangement 20. Additionally or alternatively, the controller 14 may control the second actuator 18 to move the camera arrangement 20 relative to the object 12.

Figure 5E:
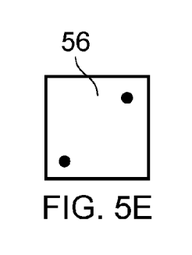

At block 54, the method includes receiving a second image of a second part of the first surface of the object from the camera arrangement, the second part being different to the first part. The first camera 201 is positioned adjacent to the second part 50 to obtain the second image 56 (illustrated in FIG. 5E) of the second part 50 of the first surface 46. The controller 14 is configured to receive the second image 56 from the first camera 201.

Figure 5F:
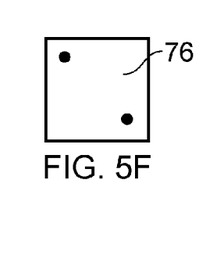
Figure 5G:
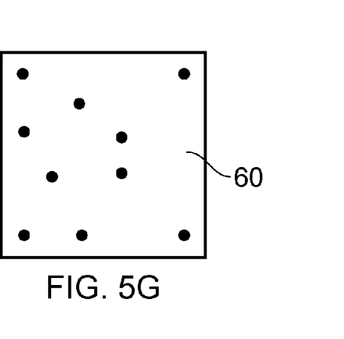

At block 74, the method includes receiving a fifth image of a second part of the second surface of the object from the camera arrangement 20, the second part being different to the first part. The second camera 202 is positioned adjacent to the second part 68 to obtain the fifth image 76 (illustrated in FIG. 5F) of the second part 68 of the second surface 64. The controller 14 is configured to receive the fifth image 76 from the second camera 202.

The method may then return to block 46 so that images of further parts of the first and second surfaces 46, 64 may be obtained.

At block 58, the method includes generating a third image using at least the first image, the second image, the fourth image and the fifth image. For example, the controller 14 may be configured to generate the third image 60 by concatenating the first image 52, the second image 56, the fourth image 72 and the fifth image 76. The third image 60 may be generated as a new data file or may be generated by changing one of the first image 52, the second image 56, fourth image 72, and the fifth image 76 as described above.

At block 62, the method includes determining a parameter associated with an abrasive surface coating on the object 12 using the third image 60. For example, the controller 14 may analyse the third image 60 to determine the number of abrasive particles 462 within the third image 60. By way of another example, the controller 14 may analyse the third image 60 to determine the average density of abrasive particles 462 within the third image 60. By way of a further example, the controller 14 may analyse the third image 60 to determine the ratio of matrix material 461 coverage to abrasive particle 462 coverage.

At block 78, the method includes controlling storage of the third image 60 in at least one memory. For example, the controller 14 may control storage of the third image 60 in the memory 30 or in the non-transitory computer readable storage medium 34. By way of a further example, the controller 14 may control storage of the third image 60 in a remote memory (that is, in 'cloud' storage).

At block 78, the method may additionally or alternatively include controlling the output device 26 to convey the third image 60 to a user. For example, the controller 14 may control a display of the output device 26 to display the third image 60. By way of another example, the controller 14 may control a printer of the output device 26 to print the third image 60 on media.

It should be appreciated that in other examples, the camera arrangement 20 may only comprise a single camera for imaging multiple surfaces. In such examples, the second actuator 18 is configured to move the camera so that each of the surfaces may be imaged by the camera.

Figure 6A:
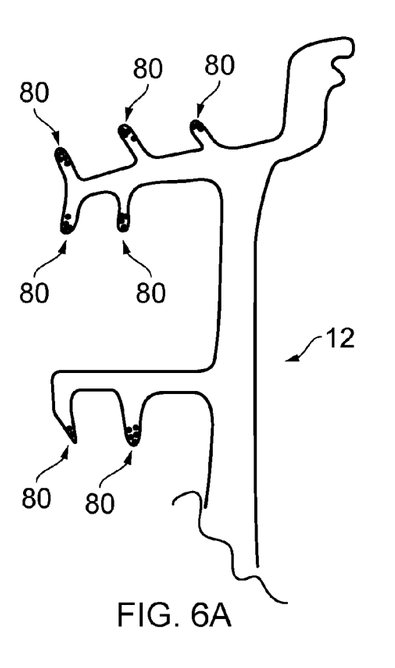
FIGS. 6A, 6B, 6C illustrate another process of imaging an object according to various examples.
Figure 6B:
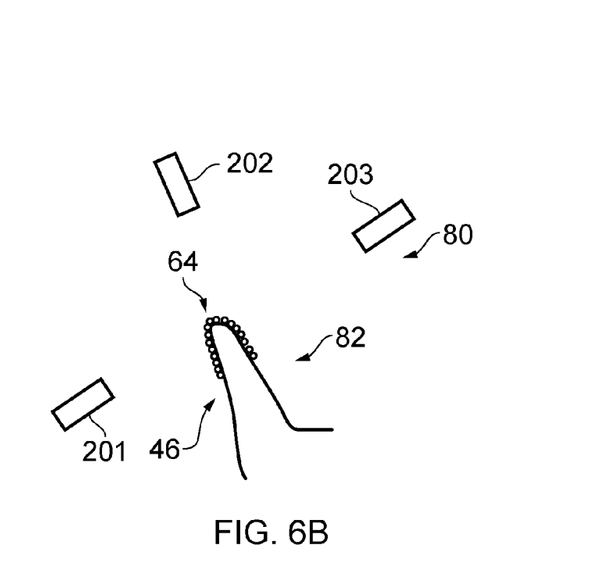
Figure 6C:
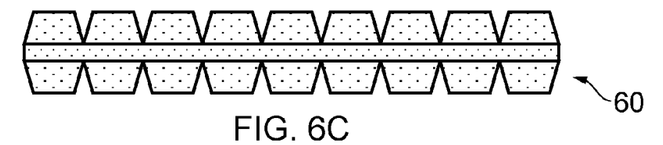

Furthermore, it should be appreciated that in other examples, the camera arrangement 20 may comprise more than two cameras for imaging multiple surfaces. By way of an example, FIG. 6A illustrates a cross sectional diagram of a cover plate 12 that includes a plurality of seal fins 80. As illustrated in FIG. 6B, each seal fin 80 has a first surface 46, a second surface 64, and a third surface 82 having abrasive surface coatings. The camera arrangement 20 includes a first camera 201 configured to image the first surface 46, a second camera 202 configured to image the second surface 64, and a third camera 203 configured to image the third surface 82. FIG. 6C illustrates a third image 60 generated by the controller 14 using the images output by the first, second and third cameras 201, 202, 203.

FIG. 7 illustrates a flow diagram of a method of controlling coating of an object 12 according to various examples.

At block 84, the method includes adjusting an abrasive coating application process using the determined parameter. By way of an example, the controller 14 may store an abrasive coating application process 86 in the memory 30. Briefly, the abrasive coating application process 86 may include: controlling cleaning of the object 12; controlling coating of the object 12 with wax; controlling removal of wax to expose one or more surfaces of the object 12; controlling cleaning of the exposed surfaces; controlling plating of the exposed surfaces with a matrix material; controlling coating of abrasive particles on the exposed surfaces; and controlling plating of the object 12 with a matrix material to ensure that the abrasive particles are securely fixed on the object 12.

The controller 14 may adjust the abrasive coating application process 86 where the determined parameter has a value outside of a range of values. For example, where the parameter is number of abrasive particles 462, the controller 14 may adjust the abrasive coating application process 86 where the number of abrasive particles 462 is outside of a numerical range. By way of another example, where the parameter is the density of abrasive particles 462, the controller may adjust the abrasive coating application process 86 where the density of abrasive particles 462 is outside of a range of densities.

The adjustment of the abrasive coating application process 86 may include adjusting a rate of deposition of the abrasive particles 462 on the object 12. The adjustment of the abrasive coating application process 86 may additionally or alternatively include adjusting a quantity of wax to be removed from the object 12. The adjustment of the abrasive coating application process 86 may additionally or alternatively include adjusting how the object is to be manipulated during application of the abrasive particles 462 to the object 12. The adjustment of the abrasive coating application process 86 may additionally or alternatively include adjusting a time period in which the object 12 is to be plated. It should be appreciated that the above examples are non-limiting and that other process variables may be adjusted using the determined parameter.

At block 88, the method includes controlling coating of the object 12 and/or one or more further objects using the adjusted abrasive coating application process 86. For example, the controller 14 may control the coating apparatus 22 to perform the adjusted abrasive coating application process 86 on an object 12.

By way of an example, the controller 14 may control the wax application apparatus 38 to provide a greater or lesser depth of wax to the object 12, and/or may control the wax application apparatus 38 to remove a greater or lesser quantity of wax from the object 12 to expose surfaces to be plated. By way of a further example, the controller 14 may control the plating apparatus 40 so that the rate of deposition of the abrasive particles 462 on the object 12 is increased or decreased. Additionally or alternatively, the controller 14 may control the plating apparatus 40 so that a time period in which the object 12 is to be plated is increased or decreased (and thus increase or decrease the matrix material 461 surrounding the abrasive particles 462). By way of another example, the controller 14 may control the manipulator 42 so that an increased or decreased quantity of abrasive particles 462 is plated on the object 12.

The method may then return to block 84 and the abrasive coating application process 86 may be further adjusted.

The apparatus 10 and methods described above may provide several advantages. Firstly, the inspection of an abrasive surface coating may enable the abrasive coating application process to be changed for the object being coated and/or for subsequent objects to be coated. This may result in improved abrasive surface coatings on objects. Secondly, the generation of the third image 60 may facilitate the inspection of an abrasive surface coating since the data file of the third image 60 may be easily shared amongst engineers and analysed.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A method of inspecting an object, the method comprising:
   receiving a first image of a first part of a first surface of the object from a camera arrangement;
   controlling relative movement between the camera arrangement and the object through a predetermined distance;
   receiving a second image of a second part of the first surface of the object from the camera arrangement, the second part being different from the first part;
   generating a third image using at least the first image and the second image; and
   determining a parameter associated with a surface coating that is an abrasive on the object using the third image.

2. The method according to claim 1, further comprising: receiving a fourth image of a first part of a second surface of the object from the camera arrangement, the second surface being different to the first surface, wherein the generation of the third image comprises using the fourth image.

3. The method according to claim 2, further comprising: receiving a fifth image of a second part of the second surface of the object from the camera arrangement, the second part being different to the first part, wherein the generation of the third image comprises using the fifth image.

4. The method according to claim 1, wherein controlling relative movement between the camera arrangement and the object comprises controlling a first actuator to move the object relative to the camera arrangement.

5. The method according to claim 1, wherein controlling relative movement between the camera arrangement and the object comprises controlling a second actuator to move the camera arrangement relative to the object.

6. The method according to claim 1, further comprising controlling storage of the third image in at least one memory.

7. The method according to claim 1, further comprising adjusting an abrasive coating application process using the determined parameter.

8. The method according to claim 7, wherein adjusting the abrasive coating application process includes adjusting a rate of deposition of the abrasive particles on the object.

9. The method according to claim 7, wherein adjusting the abrasive coating application process includes adjusting a quantity of wax to be removed from the object.

10. The method according to claim 7, wherein adjusting the abrasive coating application process includes adjusting how the object is to be manipulated during application of the abrasive particles to the object.

11. The method according to claim 7, wherein adjusting the abrasive coating application process includes adjusting a time period in which the object is to be plated.

12. The method according to claim 7, further comprising controlling coating of the object or one or more further objects using the adjusted abrasive coating application process.

13. A non-transitory computer readable storage medium comprising computer readable instructions that, when read by a computer, cause performance of the method according to claim 1.

14. Apparatus for inspecting an object, the apparatus comprising a controller configured to:
receive a first image of a first part of a first surface of the object from a camera arrangement;
control relative movement between the camera arrangement and the object through a predetermined distance;
receive a second image of a second part of the first surface of the object from the camera arrangement, the second part being different to the first part;
generate a third image using at least the first image and the second image; and
determine a parameter associated with an abrasive surface coating on the object using the third image.

15. Apparatus according to claim 14, wherein the controller is configured to adjust an abrasive coating application process using the determined parameter.

16. Apparatus according to claim 15, wherein the controller is configured to adjust a rate of deposition of the abrasive particles on the object to adjust the abrasive coating application process.

17. Apparatus according to claim 15, wherein the controller is configured to adjust a quantity of wax to be removed from the object to adjust the abrasive coating application process.

18. Apparatus according to claim 15, wherein the controller is configured to adjust a time period in which the object is to be plated to adjust the abrasive coating application process.

19. Apparatus according to claim 15, wherein the controller is configured to control coating of the object or one or more further objects using the adjusted abrasive coating application process.

20. Apparatus according to claim 14, wherein the parameter associated with the abrasive surface coating on the object is the number of abrasive particles on the surface of the object.

* * * * *